(12) United States Patent  
Wang

(10) Patent No.: US 9,229,822 B2  
(45) Date of Patent: Jan. 5, 2016

(54) DATA DISASTER RECOVERY

(71) Applicant: CA, Inc., Islandia, NY (US)

(72) Inventor: Zhiye Wang, Beijing (CN)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 14/506,908

(22) Filed: Oct. 6, 2014

(65) Prior Publication Data

US 2015/0026518 A1    Jan. 22, 2015

Related U.S. Application Data

(62) Division of application No. 13/159,768, filed on Jun. 14, 2011, now Pat. No. 8,856,591.

(51) Int. Cl.
*G06F 11/00* (2006.01)
*G06F 11/14* (2006.01)

(52) U.S. Cl.
CPC ........ *G06F 11/1469* (2013.01); *G06F 11/1417* (2013.01); *G06F 11/1456* (2013.01); *G06F 11/1448* (2013.01); *G06F 2201/805* (2013.01); *G06F 2201/84* (2013.01)

(58) Field of Classification Search
CPC . G06F 9/4401; G06F 11/1469; G06F 9/4406; G06F 11/1417; G06F 11/2284; G06F 9/4403; G06F 11/1448; G06F 2201/805; G06F 2201/84

See application file for complete search history.

(56) References Cited

U.S. PATENT DOCUMENTS

| | | |
|---|---|---|
| 6,513,051 B1 | 1/2003 | Bolosky et al. |
| 7,197,520 B1 | 3/2007 | Matthews et al. |
| 7,353,355 B1 | 4/2008 | Tormasov et al. |
| 7,725,704 B1 | 5/2010 | Beaverson et al. |
| 7,809,693 B2 | 10/2010 | Lango et al. |
| 8,127,095 B1 | 2/2012 | Colgrove et al. |
| 8,161,321 B2 | 4/2012 | Zheng et al. |
| 8,204,863 B2 | 6/2012 | Sawdon et al. |
| 8,364,648 B1 | 1/2013 | Sim-Tang |
| 8,375,005 B1 | 2/2013 | Claudatos et al. |
| 8,468,334 B1 * | 6/2013 | Jonna et al. ........................ 713/2 |
| 8,548,959 B2 | 10/2013 | Wang |
| 8,856,591 B2 | 10/2014 | Wang |
| 8,924,352 B1 | 12/2014 | Andruss et al. |
| 2004/0143563 A1 | 7/2004 | Saake et al. |

(Continued)

OTHER PUBLICATIONS

"U.S. Appl. No. 12/955,528, Examiner Interview Summary mailed Dec. 18, 2012", 3 pgs.

(Continued)

*Primary Examiner* — Jason Bryan
(74) *Attorney, Agent, or Firm* — Gilliam IP PLLC

(57) ABSTRACT

A system includes a production computer machine that includes an operating system and a driver stack. The driver stack includes a file system layer, a recovery driver, a storage layer, a driver layer, a bus driver layer, and a storage device. The system also includes a backup computer processor coupled to the production computer machine via the recovery driver. The recovery driver is configured to commence a recovery of data from the backup computer processor, receive a disk access request from the file system layer, determine if the disk access request accesses data that has not yet been recovered from the backup computer processor, and initiate an on-demand recovery request from the backup computer processor when the data has not been recovered from the backup computer processor.

12 Claims, 8 Drawing Sheets

(56) References Cited

U.S. PATENT DOCUMENTS

| | | |
|---|---|---|
| 2004/0267822 A1 | 12/2004 | Curran et al. |
| 2005/0021566 A1 | 1/2005 | Mu |
| 2005/0177767 A1 | 8/2005 | Furuya et al. |
| 2006/0212644 A1 | 9/2006 | Acton et al. |
| 2007/0185934 A1 | 8/2007 | Cannon et al. |
| 2007/0271410 A1 | 11/2007 | Shackelford |
| 2007/0294320 A1 | 12/2007 | Yueh et al. |
| 2008/0263396 A1 | 10/2008 | Kimura et al. |
| 2009/0150598 A1* | 6/2009 | Jung et al. ............ 711/103 |
| 2009/0217085 A1 | 8/2009 | Van Riel et al. |
| 2010/0241618 A1 | 9/2010 | Beatty et al. |
| 2011/0087920 A1* | 4/2011 | Hendricks et al. ........ 714/21 |
| 2011/0125717 A1 | 5/2011 | Manson et al. |
| 2011/0246429 A1 | 10/2011 | Prahlad et al. |
| 2012/0005379 A1 | 1/2012 | Dutch et al. |
| 2012/0136831 A1 | 5/2012 | Wang |
| 2012/0324280 A1 | 12/2012 | Wang |
| 2014/0095451 A1 | 4/2014 | Wang |

OTHER PUBLICATIONS

"U.S. Appl. No. 12/955,528, Final Office Action mailed Sep. 19, 2012", 18 pgs.

"U.S. Appl. No. 12/955,528, Non Final Office Action mailed May 9, 2012", 15 pgs.

"U.S. Appl. No. 12/955,528, Notice of Allowance mailed May 30, 2013", 16 pgs.

"U.S. Appl. No. 12/955,528, Response filed Jan. 22, 2013 to Final Office Action mailed Sep. 19, 2012", 11 pgs.

"U.S. Appl. No. 12/955,528, Response filed Aug. 9, 2012 to Non Final Office Action mailed May 9, 2012", 10 pgs.

"U.S. Appl. No. 13/159,768, Non Final Office Action mailed Jan. 17, 2014", 12 pgs.

"U.S. Appl. No. 13/159,768, Notice of Allowance mailed Jun. 3, 2014", 10 pgs.

"U.S. Appl. No. 13/159,768, Response filed Apr. 15, 2014 to Non Final Office Action mailed Jan. 17, 2014", 11 pgs.

Nagarajan, et al., "Self-Recovery in Server Programs", In: Proc. 2009 Int'l Symposium on Memory Management, Available at: ACM., (2009), 49-58.

"U.S. Appl. No. 14/042,363, Non Final Office Action mailed Mar. 3, 2015", 15 pgs.

"U.S. Appl. No. 14/042,363, Preliminary Amendment filed Dec. 6, 2013", 8 pgs.

* cited by examiner

DATA DISASTER RECOVERY

PRIORITY APPLICATION

The present application is a divisional application of and claims the benefit of priority under 35 U.S.C. §120 to U.S. patent application Ser. No. 13/159,768 filed on 14 Jun. 2011, and issued as U.S. Pat. No. 8,856,591; which application is incorporated herein by reference in its entirety.

TECHNICAL FIELD

The present disclosure relates to a system and method for data recovery, and in an embodiment, but not by way of limitation, a system and method for data disaster recovery.

BACKGROUND

The amount of data in a typical enterprise environment is rapidly increasing. When the amount of data grows from several gigabytes to several terabytes, the backup window (i.e., the time that it takes to complete a backup of files) also increases. While this may be a challenge to an IT department, it is normally not a serious issue—after all, the system can still be up and running during a backup procedure. However, a serious challenge exists at recovery time. At recovery time, the data has been lost and consequently is not available to users of the system, and the users are waiting for the data to be restored and become available again. Consequently, the art would benefit from a system and method that permits backed up data to become available rather quickly.

SUMMARY

In an embodiment, a method includes booting a computer processor system. After completion of the booting process, the process commences a recovery of data from a backup server. After the commencement of the recovery of data from the backup server, the process receives a disk access request and analyzes a bitmap to determine if the disk access request accesses a block of data that has not yet been recovered from the backup server. The process further initiates an on demand recovery request to the backup server for the block of data that is subject to the disk access request and that has not yet been recovered from the backup server. The process restores the block of data as a function of the demand recovery request, and after restoring the block data, sets a bit in the bit map corresponding to the block data.

In another embodiment, a system includes a production computer machine, wherein the production computer machine includes an operating system and a driver stack, and the driver stack includes a file system layer, a recovery driver, a storage layer, a bus driver layer, and a storage device. The system also includes a backup computer processor coupled to the production computer machine via the recovery driver. The recovery driver is configured to commence a recovery of data from the backup computer processor, receive a disk access request from the file system layer, determine if the disk access request accesses data that has not yet been recovered from the backup computer processor, and initiate an on-demand recovery request from the backup computer processor when the data has not been recovered from the backup computer processor.

In another embodiment, a process includes creating a snapshot of a first disk that is to be backed up, storing the snapshot on a second disk, retrieving a boot loader, a kernel image, and an initial RAM disk image from the second disk, loading a recovery agent onto the second disk, and loading a recovery driver onto the initial RAM disk image.

DETAILED DESCRIPTION

Disk to disk backup software provides functionality that backs up an entire disk of a production machine. This includes files, directories on that disk, and meta data (e.g., a boot sector) of that disk. Generally, any block of data on the source disk can be mapped to a block of data on backup media. The backup media is stored on a disk device so that any block on the media can be located quickly. Disk to disk backup software has its advantages for disaster recovery cases. Generally, if a disk is corrupted, a user has to replace the disk with a new disk. In such a scenario, the user has to install the operating system on the disk, and then install all the required application software on the disk. After that, the user has to restore the user's data to the new disk. But for disk to disk backup software, the user could simply restore the data blocks from backup media to the destination disk. However, such a process will not appreciably reduce the time required for the whole recovery operation. The user still needs to wait for several hours before the disaster recovery is finished. This time that the user has to wait is referred to as out of service time.

One or more embodiments are specifically designed for disk to disk backup software. The embodiments may not necessarily reduce the time needed for disaster recovery, but they can minimize the out of service time of the production environment, in some cases from many hours to several minutes. The embodiments can be applied to both Linux systems, Windows systems, and other operating systems.

Disaster recovery is a process that recovers from a disaster in an IT environment. The typical causes of a disaster include hardware errors (e.g., disk is corrupted) or software errors (e.g., important system files are deleted). Generally, these cases cause the operating system to function poorly.

A Preboot eXecution Environment (PXE, and also known as Pre-Execution Environment) is an environment to boot computers using a network interface independently of data storage devices (like hard disks) or installed operating systems.

An initial random access memory (RAM) disk is a temporary file system used in the boot process of a Linux kernel and in other computer system processes. It is commonly used to make preparations before the real root file system can be mounted.

A generic storage layer is generally provided by the operating system kernel. It may further operate on a hardware specific driver but provide a unified interface to an upper layer. The driver on top of this layer does not need to worry about the difference among different storage devices at the lower layer.

A snapshot is the state of a disk at a particular point in time.

Figure 1:
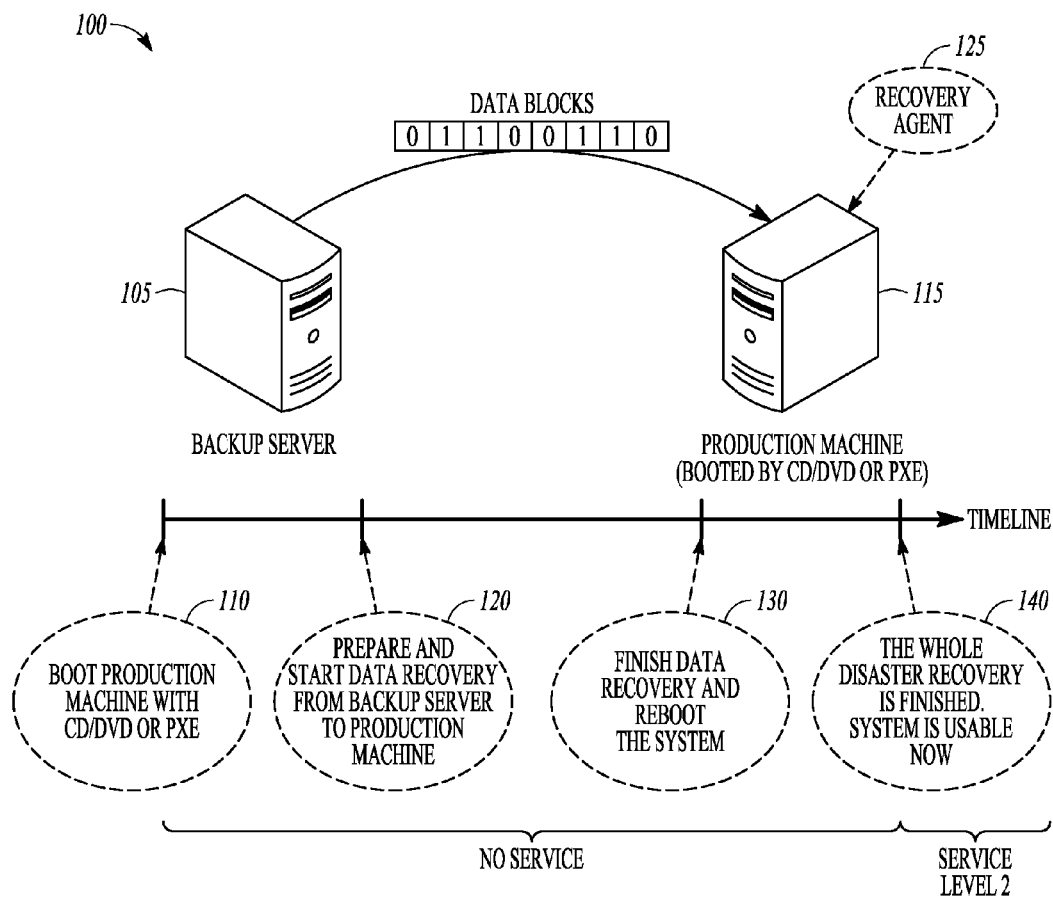
FIG. 1 is a block diagram of an example embodiment of a disaster recovery system.

FIG. 1 illustrates a traditional method 100 of disaster recovery. It generally involves four steps. First, at 110, the production machine 115 is booted using a vendor provided CD/DVD. The boot process launches an application referred to as the recovery agent 125. The recovery agent 125 is responsible for preparing the recovery environment (e.g., making partitions on the disk) and transferring data from a backup server 105 to the production machine 115. The boot process can be done with a PXE protocol if the backup software supports it. Second, at 120, the recovery agent prepares the recovery environment and starts transferring data from the backup server 105 to the production machine 115. Depending on the data to be recovered and the network speed, the data transfer may take several hours or more. Third, at 130, after data transfer is finished, the production machine 115 needs a reboot so that it can boot from the operating system that was just recovered. Fourth, at 140, after reboot, the disaster recovery is finished, and the system is ready for service. During the method 100, a user has to wait for several hours before the production machine is recovered from the disaster.

Figure 2:
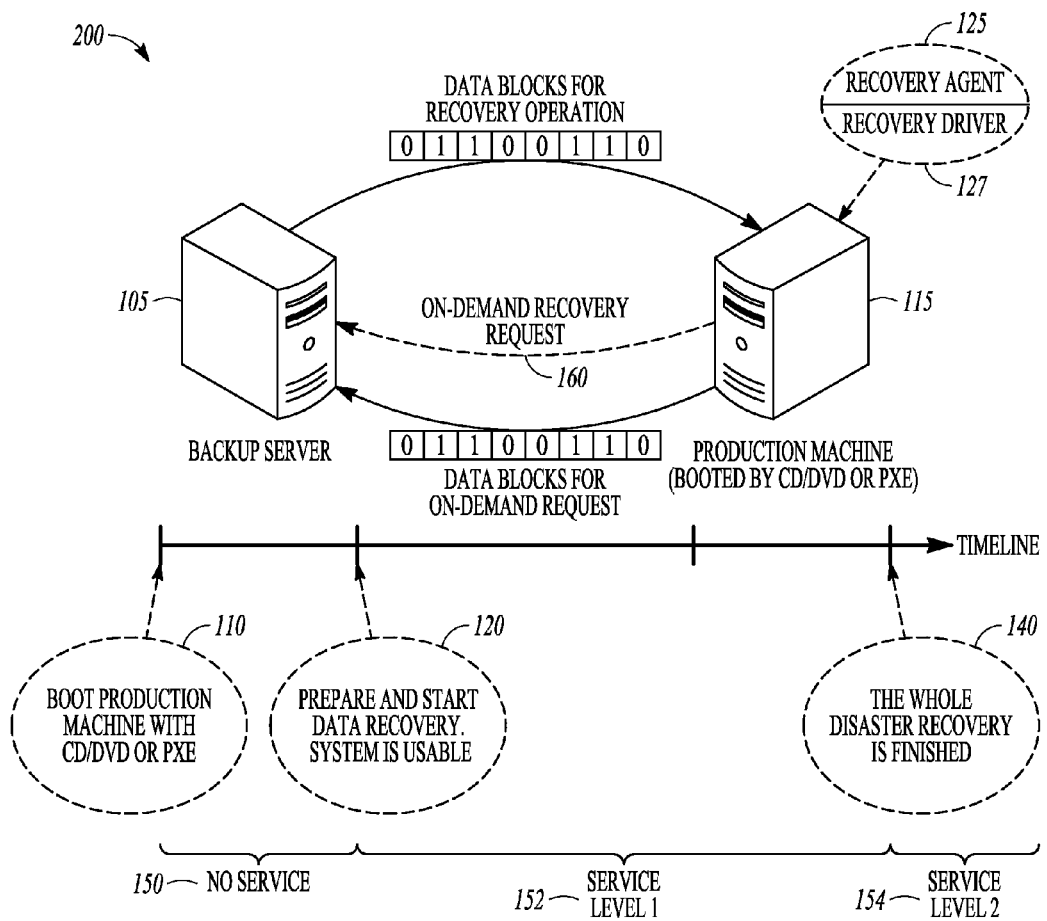
FIG. 2 is a block diagram of another example embodiment of disaster recovery system.

FIG. 2 illustrates an embodiment of a disaster recovery method 200. The method 200 involves components from the traditional method 100, but includes additional components that permit the system to be usable once the recovery starts. Furthermore, no reboot is needed. As illustrated in FIG. 2, the entire disaster recovery process 200 is split into three periods. During time period 150 no service is available. This is the time period after the system starts to boot, but before the boot process is finished. During this time period, the system cannot provide service to an outside user. Time period 152 is the period after the system is booted, but before the disaster recovery is finished. During this time period, the system can provide service to an outside user, but sometimes (but not always), the user of the service may experience some kind of delay. Time period 154 is the time period after the disaster recovery is finished. During this time period, the system is back to normal functionality.

Compared with the traditional method 100, the method 200 can provide service once the system is booted. The boot process may only take minutes. That means a user can get serviced only minutes after the user prepared the hardware. That is an advantage of method 200, and another advantage is that no reboot is needed in the process 200.

The method 200 recovers data just as the traditional method 100. However, in addition to that, it introduces a new component, the recovery driver 127. The recovery driver 127 intercepts all disk access requests (e.g., reads and writes), and if it finds the request is trying to access data that has not yet been recovered, it will initiate an on-demand recover request 160 to the backup server 105 to recover that piece of data before it is accessed. The backup server 105 must be able to return data blocks at a specified location, according to the recovery driver's request. The recovery agent 125 is only used to manage the recovery driver 127, to monitor recovery process status, and to inform the user once disaster recovery is finished.

Figure 3:
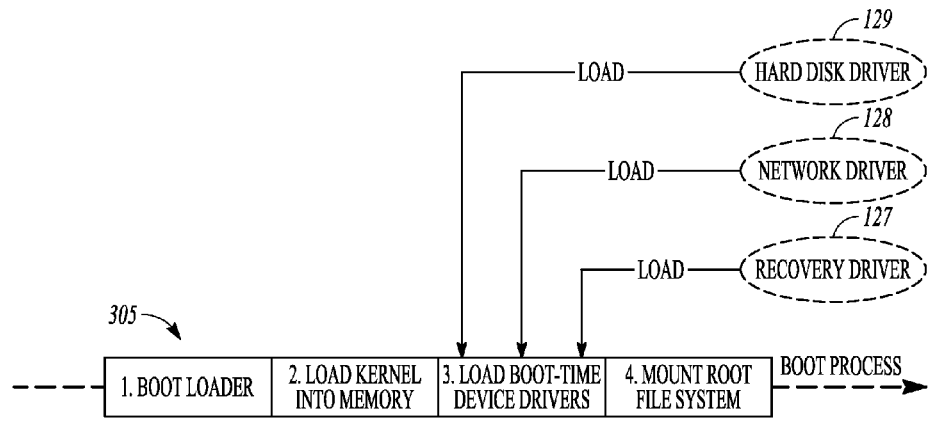
FIG. 3 is a block diagram of an example embodiment a loading process for drivers.

FIG. 3 illustrates the loading of the recovery driver 127. FIG. 3 shows a general boot process 305 that may be similar among many kinds of operating systems, although the order of the steps may be a little different in certain cases (e.g., for a Windows operating system, step 3 is performed in advance of step 2). However, that will not affect the usage of the recovery driver 127. The recovery driver 127 should be loaded into memory and be initialized before mounting the root file system by either a boot loader or a kernel. The following drivers should also be loaded along with recovery driver 127 and should be initialized before the recovery driver. The network driver 128 should be initialized before the recovery driver because the recovery driver internally needs to connect to the network, and therefore has to make use of network driver 128. The hard disk driver 129 could be a general driver for IDE or SCSI, or any special drivers that are needed for operating the hard disk of the production machine.

The recovery driver 127 handles two tasks. First, it intercepts a data access request (e.g., a read or a write), and initiates on-demand recovery request 160 to the backup server 105 if it is needed. Second, it recovers data from the backup server to local disk. The sections below will depict the two tasks in more detail.

Figure 4:
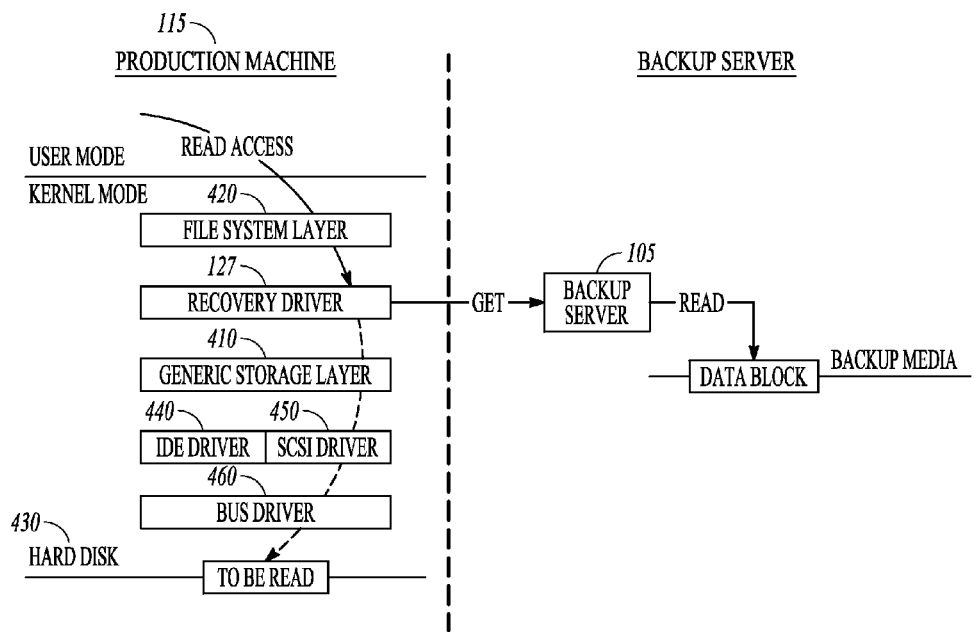
FIG. 4 is a block diagram of an example embodiment of the system layers of a production system.

FIG. 4 illustrates the position of recovery driver 127 in the operating system's driver stack. The recovery driver 127 is on the top of a generic storage layer 410 (this is generally provided by the operating system), but is under the file system layer 420. The recovery driver 127 intercepts all read/write requests that come from the file system layer 420, and decides where the requests will go. The recovery driver makes use of the generic storage layer 410 to operate on the hard disk 430 if needed. The recovery driver 127 should be at the first layer on top of the generic storage layer 410. The production machine 115 also includes an IDE (Integrated Development Environment or Integrated Drive Electronics) driver 440, an SCSI driver 450, and a bus driver 460. FIG. 4 further illustrates how the recovery driver 127 handles a read request. After receiving a read request from the file system layer 420, the recovery driver 127 first checks its internal bitmap to decide if the target data block is on a local disk. If it is, the recovery driver simply passes the read request to the generic storage layer 410. If it is not, the recovery driver 127 will try to get the data block from the backup server 105, save the data block onto the local disk, and then pass the request to the generic storage layer 410.

Figure 5:
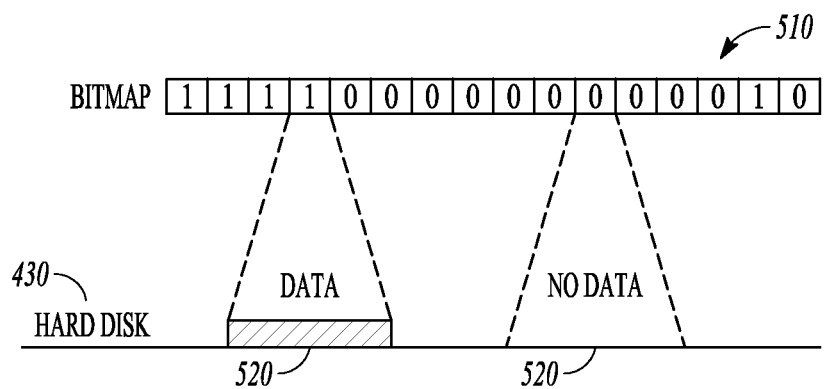
FIG. 5 is an example embodiment of a diagram of a bit map.

FIG. 5 illustrates how the recovery driver 127 internally keeps a bitmap 510 that is used to track which data block has been recovered and which data block has not been recovered. Every bit in the bitmap is mapped to a data block 520 on hard disk in order. If a bit is set to 1, it means that the corresponding data block has been recovered, or it does not need to be recovered (because there had been a write operation on that data block). If a bit is set to 0, it means that the corresponding data block needs to be recovered. The size of a data block can be configured by an end user, but it must be integral multiple of the block size of the file system which is being recovered (for example, the block size for EXT2/EXT3 on Linux is generally 1 KB or 4 KB).

FIGS. 6, 7, 9, and 10 are flowcharts of example processes 600, 700, 900, and 1000 for a disaster recovery process. FIGS. 6, 7, 9 and 10 include a number of process blocks 610-660, 710-770, 905-950, and 1010-1090 respectively. Though arranged serially in the example of FIGS. 6, 7, 9, and 10, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Figure 6:
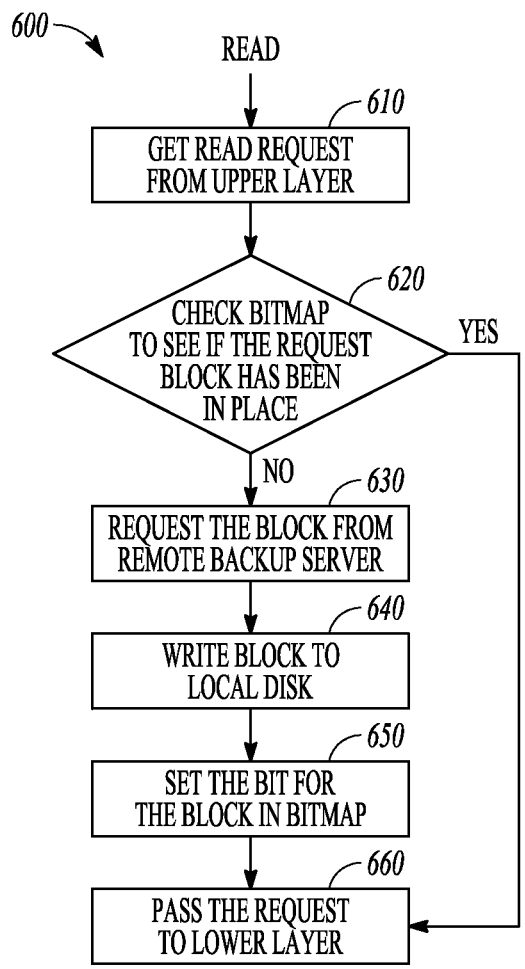
FIG. 6 is a flowchart of an example embodiment of a process for handling a read access request during a disaster recovery.

FIG. 6 is a flowchart of a process 600 that illustrates how the recovery driver 127 handles a read request. At 610, the recovery driver 127 receives the read request from the file system layer 420. At 620, if the data to be read has already been recovered, then the recovery driver 127 will simply pass the read request to general storage layer (660), that is, to read the data block from the local disk. If the data to be read has not been recovered, then the recovery driver 127 requests the data block from the remote backup server at 630. Once the recovery driver gets the data, it will write the data block onto the local disk at a specific location (640), update the bitmap (650), and pass the read request to the lower layer (660). The data retrieval operation from the backup server affects the performance of a disk read, but it's a one-time impact because once the data block is recovered, for the next read request to the same data block, the recovery driver does not need to retrieve it from the remote backup server again.

Figure 7:
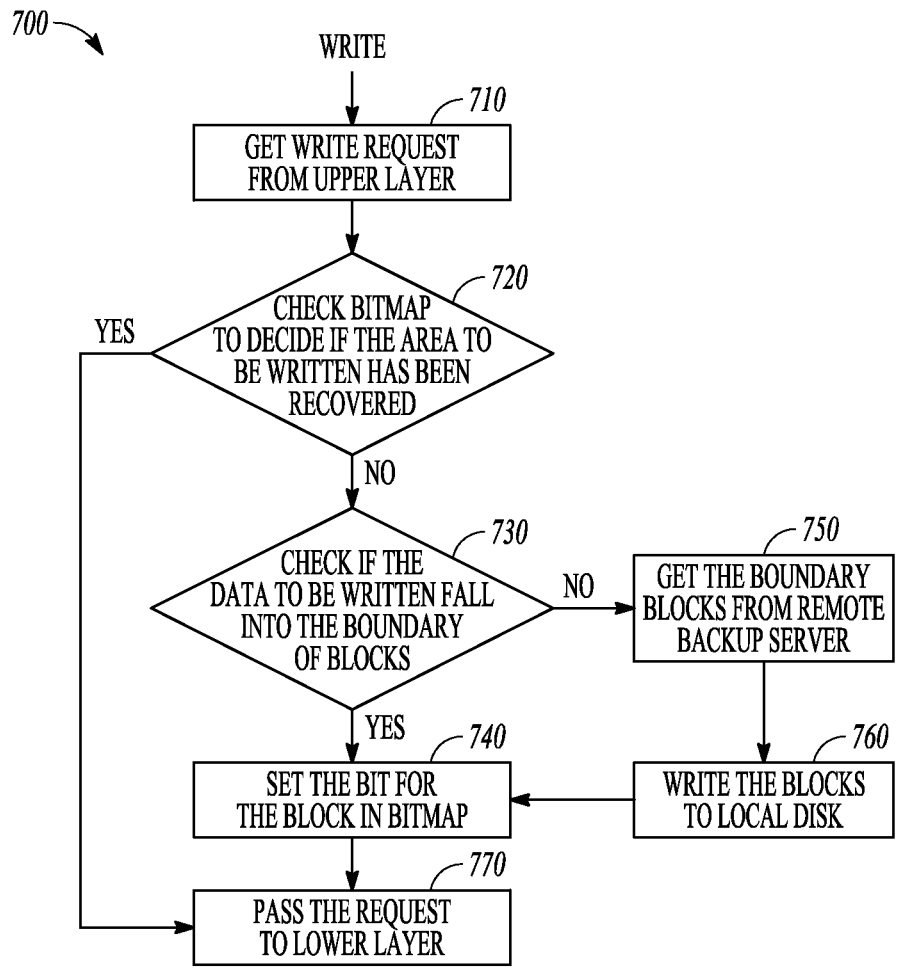
FIG. 7 is a flowchart an example embodiment of a process for handling a write access request during a disaster recovery.
Figure 8:
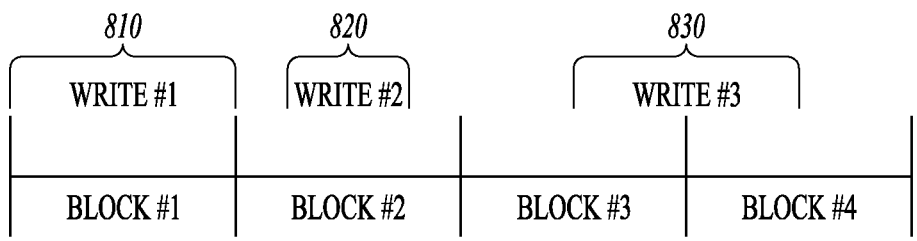
FIG. 8 is a diagram illustrating block writes.

FIG. 7 is a flowchart for a process 700 illustrating how the recovery driver 127 handles a write request (710). There are three cases involved with a write request. First, if the request is trying to write to an area that has already been recovered, then the recovery driver will simply pass the request to the lower layer (720, 770). Second, if the request is trying to write to an area that has not been recovered, but it happens to be integral multiple of the block size of the system (FIG. 8, No. 810), then the recovery driver will pass the request to the lower layer and update the bitmap for the specific area (730, 740, 770). Third, if the request is trying to write to an area that has not been recovered and the size of the data to be written is not an integral multiple of the block size (FIG. 8, Nos. 820, 830), then the recovery driver needs to first get the block from the backup server, write it onto the local disk, update the bitmap, and pass the write request to the lower layer (740, 750, 760, 770). Because an operating system generally implements cache mechanism for disk write operation, the data retrieving operation (from the backup server) will not affect performance too much. The recovery driver itself can also implement a cache mechanism (return successfully before the data is actually written to disk) to improve performance.

Figure 9:
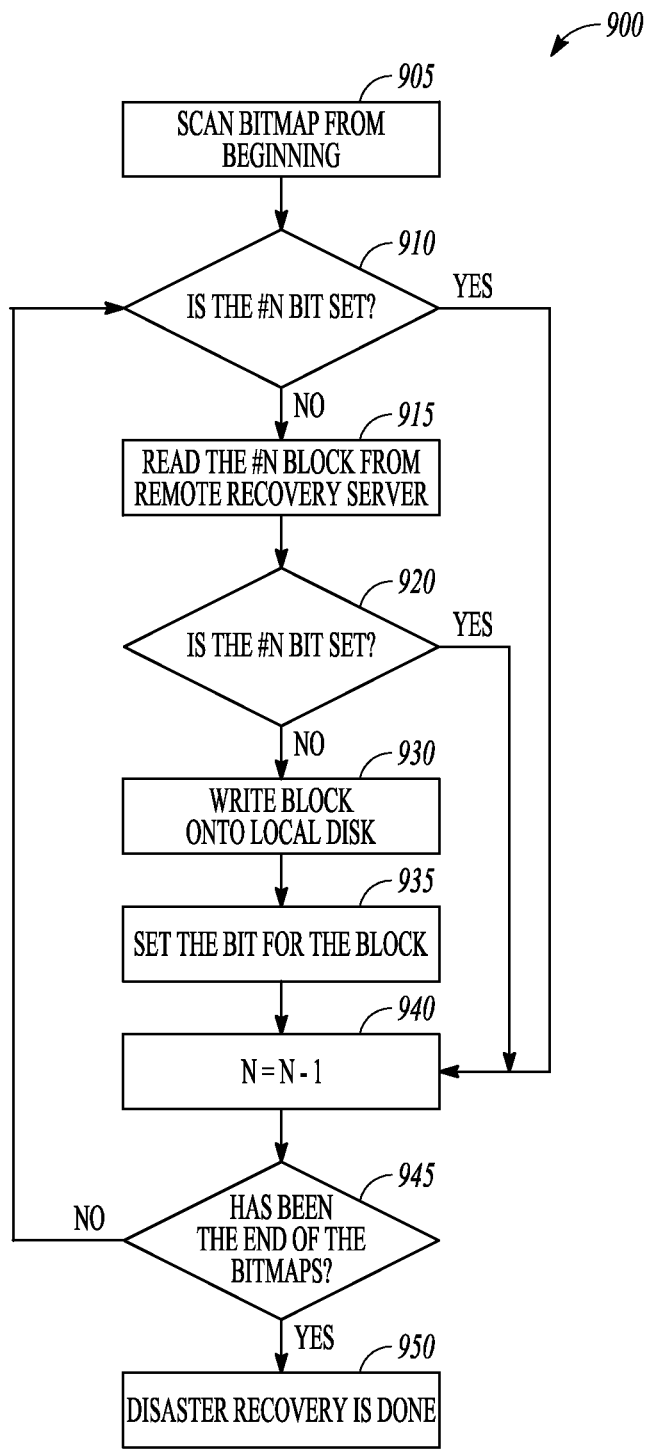
FIG. 9 is a flowchart of an example embodiment of a process to recover data from a backup server.

FIG. 9 illustrates another task 900 for the recovery driver 127, and that is to recover data from the backup server 105 to the local disk of production machine 115. The recovery driver 127 generally creates a kernel thread for this process. The recovery process is started by scanning the internal bitmap at 905. If it finds a block has not been recovered (bit "0" in the bitmap), then it will try to get the block from backup server, write the block onto local disk, and then update the bit in the bitmap (910, 915, 920, 930, 935). The block which has already been recovered (bit "1" in the bitmap) is simply skipped (910, 940). Once the recovery process finishes scanning the whole bitmap, it means the disaster recovery has been finished (945, 950). The recovery agent 125 in user space keeps monitoring this event, and once it recognizes the event, it will remove recovery driver 127 from the OS kernel, and then inform the user that the disaster recovery has been finished. After that, the system returns to normal operation.

Figure 10:
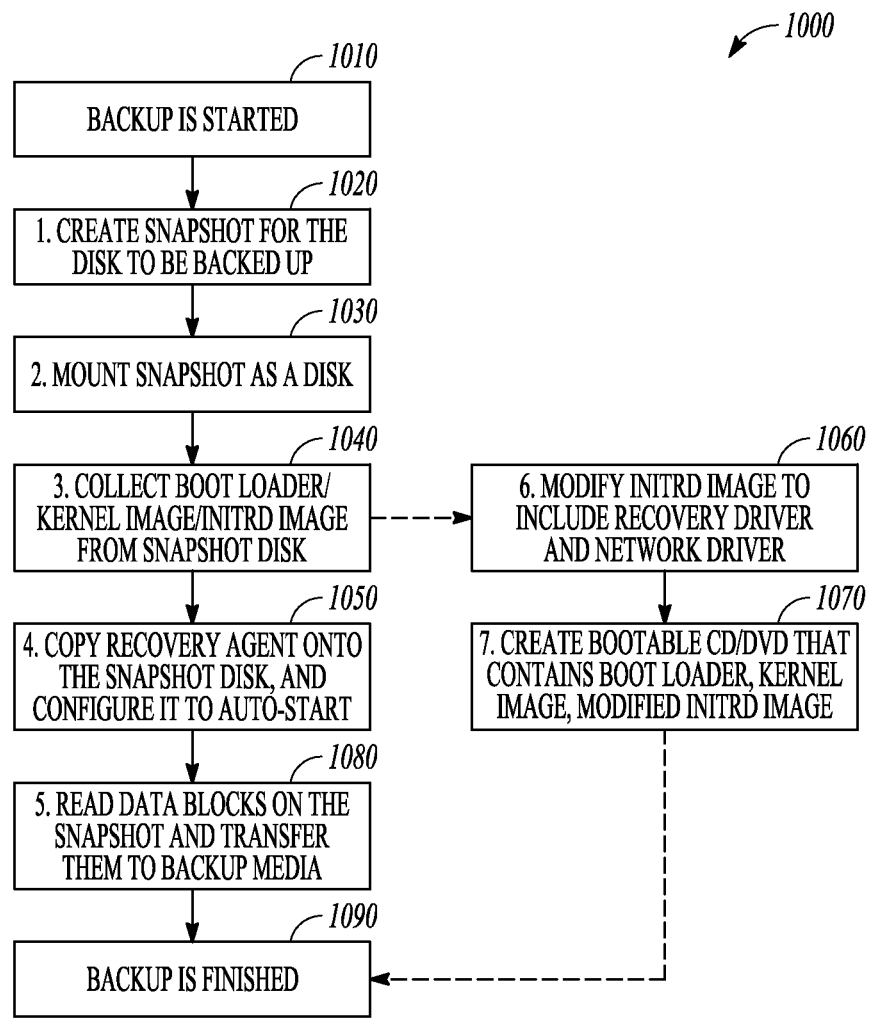
FIG. 10 is a flowchart of an example embodiment of a disaster recovery process on a Linux platform.

FIG. 10 illustrates an implementation of a disaster recovery process 1000 on a Linux platform. FIG. 10 assumes that the recovery driver and the recovery agent have been implemented, and it will therefore focus on how those components can be applied in Linux environment. A Linux boot process generally includes first loading a boot loader. The boot loader then loads the kernel and the initial RAM disk into memory. The kernel mounts the initial RAM disk as root file system. The kernel loads drivers from the initial RAM disk and performs other initialization tasks. The real root file system is mounted and further initialization tasks are finished. As long as the recovery driver is put into the initial ram disk, the driver will have the chance to be run before the real root file system is mounted. So, the initial RAM disk needs to be collected and modified during the backup process.

A general disk to disk backup process includes the following steps—create a snapshot for the disk to be backed up (1010, 1020), and read the data blocks on the snapshot and transfer them to backup media (1080, 1090). To make use of the new method of FIG. 2, several additional steps have to be inserted into traditional backup process (1030, 1040, 1050, 1060, 1070). At 1030, the snapshot is mounted as a disk so that the content on the snapshot can be accessed. Some backup software may already have this functionality to meet some other requirement. The snapshot disk needs to be editable. At 1040, the boot loader (e.g., GRUB), the kernel image file, and the initial RAM disk image files are collected. These files will be used for creating a bootable CD/DVD. At 1050, the recovery agent is copied onto the snapshot disk, and it is configured be started automatically after the Linux OS is started. In this manner, the recovery agent will be started once the OS is booted so it has a chance to monitor the recovery driver's status.

After the boot loader, the kernel image file, and the initial RAM disk files are set up, the recovery driver needs to be inserted into the initial RAM disk image file. The initial RAM disk image file is generally a compressed archive file. So, the image file could be extracted to a folder, the recovery driver executable file could be included (network driver should also be included), and the recovery driver registered so that it is loaded during system boot time. Then, an archive file is generated (using Linux command cpio) and compressed (using Linux command gzip) again. Once all these things are done, a bootable CD/DVD can be created using those files. This CD/DVD will be used to boot the production machine on which the disaster recovery process to be run. To improve performance, a tool could be created that is used to create a Linux swap partition on the local disk. The tool can be included into the initial RAM disk, and could be run before the recovery driver is initialized. The recovery driver does not need to intercept the disk read/write request to the swap partition.

Figure 11:
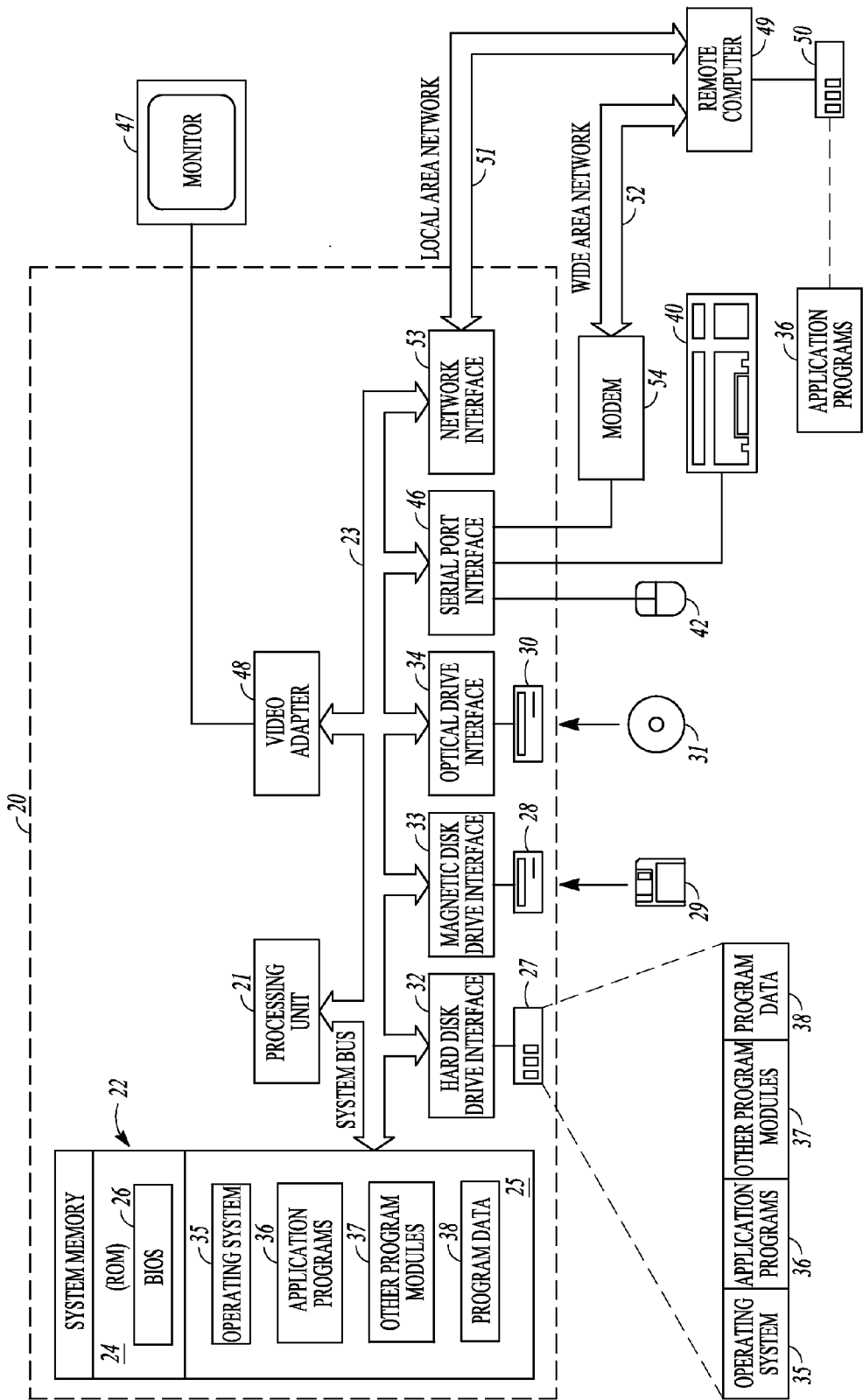
FIG. 11 is a block diagram of an example embodiment of a computer system upon which one or more embodiments of the current disclosure can execute.

FIG. 11 is an overview diagram of a hardware and operating environment in conjunction with which embodiments of the invention may be practiced. The description of FIG. 11 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 11, a hardware and operating environment is provided that is applicable to any of the servers and/or remote clients shown in the other Figures.

As shown in FIG. 11, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 11 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Thus, an example system, method and machine readable medium for backing up data and for restoring backed up data have been described. Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A method comprising:
    creating a snapshot of a first disk that is to be backed up;
    storing the snapshot on a second disk;
    retrieving a boot loader, a kernel image, and an initial RAM disk image from the second disk;
    loading a recovery agent onto the second disk; and
    loading a recovery driver onto the initial RAM disk image by:
        extracting the initial RAM disk image and storing the initial RAM disk image in a folder;
        placing the recovery driver in the folder;
        configuring the recovery driver to be loaded during system boot time;
        generating a backup file; and
        compressing the backup file.

2. The method of claim 1, wherein the method is configured to run on a Linux operating system.

3. The method of claim 1, wherein the recovery agent is configured to automatically start after an operating system is started.

4. The method of claim 1 further comprising:
    using the compressed backup file to create a bootable computer storage medium; and
    using the bootable computer storage medium to boot a production machine.

5. One or more non-transitory machine-readable media having program code stored therein, the program code comprising instructions to:
    create a snapshot of a first disk that is to be backed up;
    store the snapshot on a second disk;
    retrieve a boot loader, a kernel image, and an initial RAM disk image from the second disk;
    load a recovery agent onto the second disk; and
    load a recovery driver onto the initial RAM disk image, wherein the instructions to load the recovery driver onto the initial RAM disk image comprise instructions to:
    extract the initial RAM disk image and store the initial RAM disk image in a folder;
    place the recovery driver in the folder;
    configure the recovery driver to be loaded during system boot time; generate a backup file;
    and compress the backup file.

6. The machine-readable media of claim 5, wherein the instructions are configured to run on a Linux operating system.

7. The machine-readable media of claim 5, wherein the recovery agent is configured to automatically start after an operating system is started.

8. The machine-readable media of claim 5 further comprising instructions to:
    use the compressed backup file to create a bootable computer storage medium; and
    use the bootable computer storage medium to boot a production machine.

9. A system comprising:
    a processor; and
    a machine-readable medium having program code executable by the processor to cause the system to:
    create a snapshot of a first disk that is to be backed up;
    store the snapshot on a second disk;
    retrieve a boot loader, a kernel image, and an initial RAM disk image from the second disk;
    load a recovery agent onto the second disk,
    and load a recovery driver onto the initial RAM disk image, wherein the program code executable by the processor to load the recovery driver onto the initial RAM disk image comprises program code to:
    extract the initial RAM disk image and store the initial RAM disk image in a folder;
    place the recovery driver in the folder;
    configure the recovery driver to be loaded during system boot time;
    generate a backup file; and
    compress the backup file.

10. The system of claim 9, wherein the program code executable by the processor is configured to run on a Linux operating system.

11. The system of claim 9, wherein the recovery agent is configured to automatically start after an operating system is started.

12. The system of claim 9 further comprising program code executable by the processor to cause the system to:
    use the compressed backup file to create a bootable computer storage medium; and
    use the bootable computer storage medium to boot a production machine.

* * * * *